(12) United States Patent
Nagayama et al.

(10) Patent No.: US 10,638,767 B2
(45) Date of Patent: May 5, 2020

(54) INSTANT PROCESSED MEAT PRODUCT AND METHOD FOR PRODUCING SAME

(71) Applicant: SANYO FOODS CO., LTD., Tokyo (JP)

(72) Inventors: Yoshiaki Nagayama, Tokyo (JP); Toru Onozawa, Tokyo (JP)

(73) Assignee: SANYO FOODS CO., LTD., Tokyo (JP)

( * ) Notice: Subject to any disclaimer, the term of this patent is extended or adjusted under 35 U.S.C. 154(b) by 58 days.

(21) Appl. No.: 15/556,521

(22) PCT Filed: Mar. 18, 2016

(86) PCT No.: PCT/JP2016/058840
§ 371 (c)(1),
(2) Date: Sep. 7, 2017

(87) PCT Pub. No.: WO2016/158527
PCT Pub. Date: Oct. 6, 2016

(65) Prior Publication Data
US 2018/0049445 A1 Feb. 22, 2018

(30) Foreign Application Priority Data
Mar. 30, 2015 (JP) .................................. 2015-070361

(51) Int. Cl.
*A23B 4/03* (2006.01)
*A23B 4/033* (2006.01)
(Continued)

(52) U.S. Cl.
CPC ................ *A23B 4/033* (2013.01); *A23B 4/03* (2013.01); *A23B 4/037* (2013.01); *A23B 7/02* (2013.01);
(Continued)

(58) Field of Classification Search
CPC ........... A23B 4/002; A23B 4/03–4/031; A23B 4/033; A23B 4/037; A23B 9/08;
(Continued)

(56) References Cited

U.S. PATENT DOCUMENTS 2,457,063 A * 12/1948 Morgan ............... A23B 4/0235
426/522
3,150,985 A * 9/1964 Buscemi ............... A23B 4/037
426/438

(Continued)

FOREIGN PATENT DOCUMENTS

CN 101530213 A 9/2009
JP 58-162237 A 9/1983
(Continued)

OTHER PUBLICATIONS

International Search Report for PCT/JP2016/058840 (dated Jun. 21, 2016).

*Primary Examiner* — Drew E Becker
(74) *Attorney, Agent, or Firm* — Merchant & Gould P.C.

(57) ABSTRACT

Provided at low cost are: an instant processed meat product having extremely excellent reconstitution properties in hot water; and a method for producing the instant processed meat product having excellent production efficiency. Disclosed are: a fried and dried instant processed meat product containing pregelatinized starch; and a method for producing the fried and dried instant processed meat product. The method includes: preparing a material for the instant processed meat product, pregelatinized starch, and water; kneading the material for the instant processed meat product, the pregelatinized starch, and the water to obtain a kneaded product; shaping the kneaded product; and frying and drying the shaped kneaded product to obtain a fried and dried product.

3 Claims, 2 Drawing Sheets

(51) Int. Cl.
  *A23L 13/40*     (2016.01)
  *A23L 13/10*     (2016.01)
  *A23L 3/40*      (2006.01)
  *A23L 5/00*      (2016.01)
  *A23P 30/00*     (2016.01)
  *A23L 5/10*      (2016.01)
  *A23B 9/08*      (2006.01)
  *A23B 4/037*     (2006.01)
  *A23B 7/02*      (2006.01)

(52) U.S. Cl.
  CPC    *A23B 9/08* (2013.01); *A23L 3/40* (2013.01); *A23L 5/11* (2016.08); *A23L 5/12* (2016.08); *A23L 5/51* (2016.08); *A23L 5/55* (2016.08); *A23L 13/10* (2016.08); *A23L 13/426* (2016.08); *A23P 30/00* (2016.08)

(58) Field of Classification Search
  CPC ....... A23L 3/40; A23L 5/11–5/12; A23L 5/51; A23L 5/55; A23L 13/10; A23L 13/426; A23P 30/00; A23V 2300/10
  USPC .......... 426/641–647, 438–441, 465; 99/403–418, 472
  See application file for complete search history.

(56) References Cited

U.S. PATENT DOCUMENTS

| | | | | |
|---|---|---|---|---|
| 3,201,260 | A * | 8/1965 | Asselbergs | A23B 4/033 426/457 |
| 3,239,946 | A * | 3/1966 | Forkner | A21D 6/00 34/69 |
| 3,261,694 | A * | 7/1966 | Forkner | A23B 4/03 426/426 |
| 3,425,850 | A * | 2/1969 | Chenneour | A23B 4/03 426/281 |
| 3,506,455 | A * | 4/1970 | Chenneour | A23L 13/72 426/281 |
| 3,718,485 | A * | 2/1973 | Lankford | A23L 5/11 34/109 |
| 3,753,735 | A * | 8/1973 | Gerkens | A23L 19/19 426/441 |
| 3,759,723 | A * | 9/1973 | Gunson et al. | A23B 4/03 426/272 |
| 3,922,377 | A * | 11/1975 | Whittle | A23J 1/002 426/645 |
| 3,968,269 | A * | 7/1976 | Payne | A23J 3/26 426/629 |
| 4,039,692 | A * | 8/1977 | Clausen | A23K 50/45 426/532 |
| 4,786,516 | A * | 11/1988 | Sugisawa | A23B 4/03 34/287 |
| 5,176,069 | A * | 1/1993 | Chen | A47J 27/14 366/144 |
| 6,066,353 | A * | 5/2000 | Martines-Serna Villagran | A23L 19/15 426/637 |
| 2012/0034365 | A1 * | 2/2012 | Eisner | A23B 4/037 426/542 |
| 2013/0115359 | A1 | 5/2013 | Kanayama et al. | |

FOREIGN PATENT DOCUMENTS

| | | |
|---|---|---|
| JP | S58-162237 A | 9/1983 |
| JP | H06-169734 A | 6/1994 |
| JP | H06-319488 A | 11/1994 |
| JP | H07-147888 A | 6/1995 |
| JP | H07-313139 A | 12/1995 |
| JP | 2004-267116 A | 9/2004 |
| JP | 2006-288306 A | 10/2006 |
| JP | 2009-165463 A | 7/2009 |
| JP | 2011-30429 A | 2/2011 |
| JP | 2011-72285 A | 4/2011 |
| JP | 2012-210204 A | 11/2012 |
| WO | 2012/002540 A1 | 1/2012 |
| WO | 2018/216748 A1 | 11/2018 |

* cited by examiner

INSTANT PROCESSED MEAT PRODUCT AND METHOD FOR PRODUCING SAME

The present application is a National Stage Application under 35 U.S.C. § 371 of International Application No. PCT/JP2016/058840 filed on Mar. 18, 2016, which claims the benefit of priority to Japanese Patent Application No. 2015-070361 filed on Mar. 30, 2015, the disclosures of all of which are hereby incorporated by reference in their entireties. The International Application was published in Japanese on Oct. 6, 2016 as WO 2016/158527.

TECHNICAL FIELD

The present invention relates to an instant processed meat product and to a method for producing it. In particular, the present invention relates to an instant processed meat product with outstanding reconstitutability in hot water, and to a method for producing it.

BACKGROUND

Instant dried ingredients are dried ingredients that can be converted to a comestible state in a short period of time (for example, 3 to 5 min) by a preparation method, such as reconstitution in hot water, boiling, or addition of water and heating in a microwave oven. They are able to be stored for prolonged periods, and are mainly added to products, such as instant noodles, instant miso soups and instant chazukes. Such instant dried ingredients not only impart color to the product, but are also appealing aspects of the product and are one of the most important elements of the product.

Conventional instant dried ingredients that are known include vegetables, livestock meat and processed meat products. Examples of instant dried vegetable ingredients include potato, cabbage, Welsh onion, and seaweed, which have been dried either in their original form or after pretreatment, such as seasoning or boiling, to a final moisture content of about 2 to 3 mass % by a freeze-drying (FD) method or hot air drying (AD) method. Examples of instant dried ingredients of livestock meat include beef, pork and chicken, which have been dried either in their original form or after pretreatment, such as seasoning or boiling, by an FD or AD method. Examples of instant dried ingredients of processed meat products include processed meat products obtained from livestock meat or fish meat starting materials, including sausages, char siu, diced meat, kamaboko, and fish sausages, which have been dried by an FD or AD method.

Japanese Unexamined Patent Publication No. H06-319488 discloses dried fish meat and livestock meat products and a method for producing them. The invention of this publication discloses a technique for improving reconstitution of dried fish meat and livestock meat products by using heat-coagulating β-1,3-glucan, saccharides and treated starch products.

PRIOR ART DOCUMENTS

Patent Documents

[Patent Document 1] Japanese Unexamined Patent Publication No. H06-319488

SUMMARY OF INVENTION

Problems to be Solved by the Invention

As explained above, the main drying methods for instant dried ingredients are FD and AD methods, but each of these drying methods has advantages and disadvantages. FD is a drying method in which ingredients are frozen and the moisture is sublimated and dried in a vacuum state. FD characteristically yields dried ingredients having satisfactory reconstitutability, and brighter colors with lower discoloration. However, since it takes a long period of time for drying the ingredients, which can be approximately 24 hours, the production efficiency is poor and cost is high. AD is a drying method in which drying is carried out with hot air at approximately 100° C., the time required for drying of ingredients being about 10 hours, for example. Compared to FD, the ingredient production efficiency is higher and cost is lower, but the reconstitutability in hot water is poor and greater discoloration occurs. In particular, when FD and AD are compared with respect to livestock meat and processed meat products, it is found that livestock meat and processed meat products dried by AD have greatly inferior reconstitutability in hot water. The difference is believed to arise because the internal structure of livestock meat and processed meat products dried by FD is porous with numerous cavities, whereas the internal structure of livestock meat and processed meat products dried by AD is denser with fewer cavities.

The present invention provides an instant processed meat product with outstanding reconstitutability in hot water at low cost, and a method for producing the instant processed meat product with high production efficiency.

Means for Solving the Problems

The present inventors considered that production cost can be lowered if the drying time for instant dried ingredients of processed meat products can be shortened, and thus focused on "fry-drying methods" which provide much shorter drying times than FD and AD. A fry-drying (deep fry-drying) method is a drying method in which the drying is carried out in heated oil and fat, and it includes atmospheric fry-drying and vacuum fry-drying methods. Atmospheric fry-drying is a drying method in which the drying is carried out in oil and fat under atmospheric pressure, while vacuum fry-drying is a drying method in which the drying is carried out in oil and fat under reduced pressure. The atmospheric fry-drying method, in particular, does not require any special devices, and is therefore widely used for drying of instant noodles, for example. However, when a processed meat product is subjected to atmospheric fry-drying, it contracts into a hard form and the internal structure becomes dense, resulting in very poor reconstitutability in hot water. Japanese Unexamined Patent Publication No. H06-319488 neither discloses nor suggests production of dried fish meat and livestock meat products by fry-drying. The present inventors therefore conducted diligent research using fry-drying, and in particular, atmospheric fry-drying, for production of an instant processed meat product with satisfactory reconstitutability in hot water while significantly shortening the drying time compared to FD and AD, and has completed the present invention.

The present invention encompasses the following embodiments [1] to [10].

[1] A fry-dried instant processed meat product including gelatinized starch.

[2] A fry-dried instant processed meat product according to [1], wherein the moisture content is no greater than 5 mass %.

[3] A fry-dried instant processed meat product according to [1] or [2], including 1 to 30 mass % of the gelatinized starch per mass of the fry-dried instant processed meat product.

[4] A fry-dried instant processed meat product according to any one of [1] to [3], prepared from an instant processed meat product starting material, the gelatinized starch and water, wherein the amount of water added is 10 to 60 mass % of the total amount of the instant processed meat product starting material.

[5] A fry-dried instant processed meat product according to any one of [1] to [4], wherein the oil and fat content is no greater than 45 mass %.

[6] A method for producing a fry-dried instant processed meat product, the method including:

preparing an instant processed meat product starting material, gelatinized starch and water, kneading the instant processed meat product starting material, the gelatinized starch and water to obtain a kneaded blend, shaping the kneaded blend, and fry-drying the shaped kneaded blend to obtain a fry-dried product.

[7] A method for producing a fry-dried instant processed meat product according to [6], wherein the amount of gelatinized starch added is 1 to 15 mass % of the total amount of the instant processed meat product starting material.

[8] A method for producing a fry-dried instant processed meat product according to [6] or [7], wherein the amount of water added is 10 to 60 mass % of the total amount of the instant processed meat product starting material.

[9] A method for producing a fry-dried instant processed meat product according to any one of [6] to [8], the method including deoiling the fry-dried product to an oil and fat content of no greater than 45 mass %.

[10] An instant food including a fry-dried instant processed meat product according to any one of [1] to [5].

Effects of the Invention

According to one embodiment of the invention there is provided an instant processed meat product that has outstanding reconstitutability in hot water, and is equivalent to conventional instant processed meat products in terms of taste and texture.

According to another embodiment of the invention, by adding gelatinized starch and water to an instant processed meat product starting material and fry-drying it to produce an instant processed meat product, it is possible to produce an instant processed meat product with a shorter drying time than by FD or AD, and with outstanding reconstitutability in hot water. Shortening the drying time allows the production cost to be reduced.

While not wishing to be bound by any particular theory, it is believed that the effect of the invention is achieved by the following mechanism. Specifically, the reconstitutability of the dried instant processed meat product in hot water is improved by adding gelatinized starch that has a water absorbing function to a conventional instant processed meat product. Furthermore, addition of gelatinized starch can vastly increase the amount of water that can be added to the starting material without impairing the suitability for production (the shape retention during molding). Evaporation of large amounts of water during fry-drying renders the internal structure of the dried instant processed meat product porous. The excellent water-absorbing function of the added gelatinized starch, and the fact that the internal structure of the dried instant processed meat product is porous, presumably result in satisfactory reconstitutability in hot water that is equivalent to FD.

MODE FOR CARRYING OUT THE INVENTION

Figure 1:
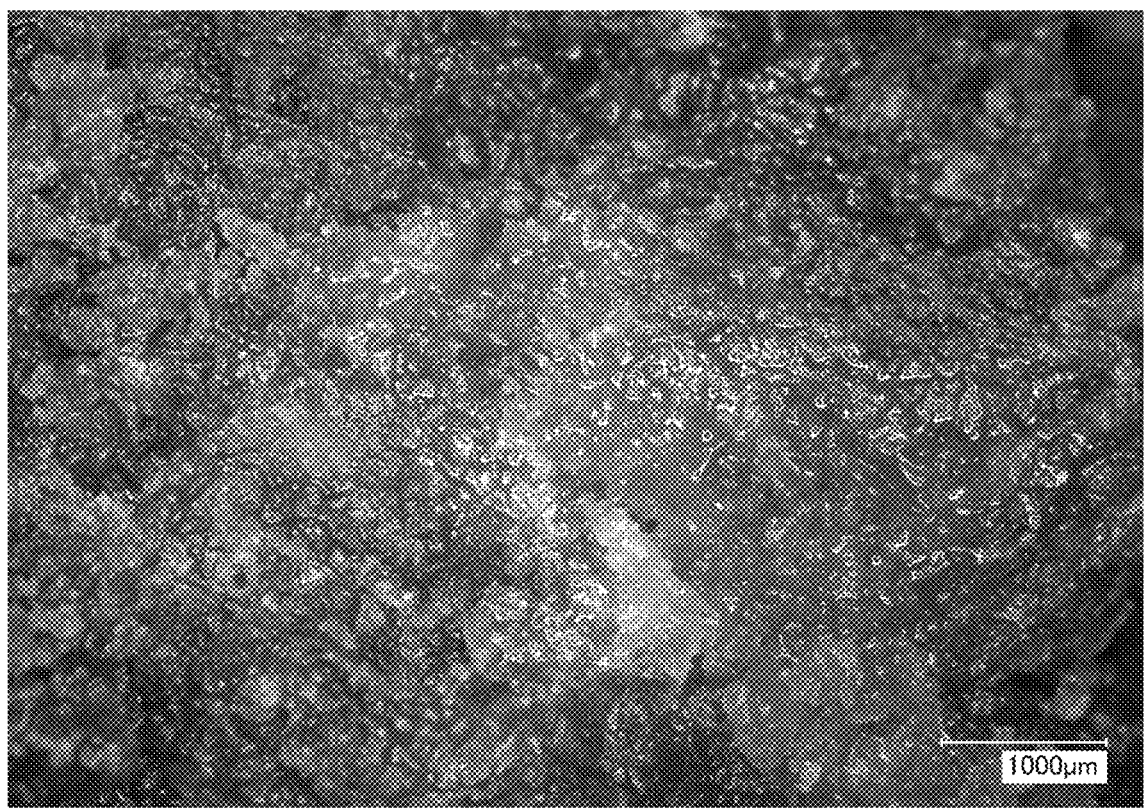
FIG. 1 is a photograph taken of the dried diced meat sample of Comparative Example 6, at a magnification of 50×.

The following detailed description is for the purpose of illustration of representative embodiments of the present invention, with reference to the accompanying drawings, with the understanding that the invention is not limited to these embodiments. All of the percent values are by mass, unless otherwise specified.

The term "instant processed meat product", as used herein, refers to a dried processed meat product that can be converted to a comestible state in a short period of time (for example, 3 to 5 min) by a preparation method, such as reconstitution in hot water, boiling, or addition of water and heating in a microwave oven.

The term "hot water", as used herein, refers to boiling water. According to certain aspects, the water used for reconstitution may be merely hot water. According to certain aspects, the temperature of the water used for reconstitution may be 85° C. or higher, 90° C. or higher, or 95° C. or higher, and up to 100° C., up to 99° C. or up to 98° C. According to certain aspects, the water added in a method of preparation by heating in a microwave oven may be at any temperature between 0° C. and 100° C.

The term "processed meat product", as used herein, refers to a processed food using livestock meat and/or fish meat as the main starting material.

The fry-dried instant processed meat product according to one embodiment of the invention includes gelatinized starch.

Instant Processed Meat Product

There are no particular restrictions on the instant processed meat product of the invention, and it may be, for example, sausage, char siu, diced meat, hamburger, meatballs, kamaboko, fish paste, fish meat sausage, or diced fish meat.

Diced meat is an instant processed meat product obtained by adding soybean protein, bread crumbs or the like as a secondary starting material to ground meat as the primary starting material, kneading the mixture and forming it into quadrilateral diced shapes, and drying it. Diced meat is used mainly as an ingredient for instant noodles. The term "kneading", as used herein, refers to thoroughly mixing and kneading.

Diced fish meat is an instant processed meat product obtained by adding secondary starting materials, such as seasonings, to fish meat or processed fish meat (for example, minced fish meat) as the primary starting material, kneading the mixture and forming it into quadrilateral diced shapes similar to diced meat, and drying it.

The fry-dried instant processed meat product of the invention can be prepared from an instant processed meat product starting material, gelatinized starch and water. The method for producing a fry-dried instant processed meat product according to one embodiment of the invention includes preparing an instant processed meat product starting material, the gelatinized starch and water, kneading the instant processed meat product starting material, gelatinized starch and water to obtain a kneaded blend, shaping the kneaded blend, and fry-drying the shaped kneaded blend to obtain a fry-dried product.

Instant Processed Meat Product Starting Material

An "instant processed meat product starting material" means a starting material other than gelatinized starch or water, which is commonly used for production of conventional instant processed meat products. However, when water is added during the production of a conventional instant processed meat product starting material, for the purpose of adjusting processed meat (for example, processed fish meat, such as minced fish), which is drier than raw meat, to the same moisture content as raw meat, or for the purpose of reconstituting a dry starting material, such as granular soybean protein, by using water, or for the purpose of improving the handleability during production, the water is also included in the instant processed meat product starting material. There are no particular restrictions on the starting materials for the instant processed meat product. In other words, the materials used for production of conventional instant processed meat products may be used, without any particular restrictions. The main starting material of the instant processed meat product may be livestock meat (for example, beef, pork or chicken), or fish meat (Alaska pollock, golden threadfin bream, lizardfish and the like). Secondary starting materials for the instant processed meat product include soybean protein, egg white, starch, bread crumbs, vegetables, such as onion, and seasonings (salt, sugar, soy sauce, spices and the like).

Gelatinized Starch

The gelatinized starch used in the invention may be prepared by using tapioca, potato starch, corn starch, waxy corn starch, wheat starch, sweet potato starch or the like as the starch starting material. Gelatinized starch may be obtained by gelatinization, drying and grinding of the aforementioned starch starting material using a drum dryer, spray drier, extruder or the like. For example, in the production of gelatinized starch using a drum dryer, a 20 to 25 mass % aqueous suspension of the starch starting material is formed, the suspension is allowed to stand at 90 to 120° C. for 4 to 7 minutes, and dried for a slightly less than 1 minute in the drum dryer with the surface temperature thereof set to approximately 150° C., to obtain the desired gelatinized starch.

The gelatinized starch used in the invention may be subjected to etherification, esterification or crosslinking treatment, prior to gelatinizing treatment. Such treatments may be carried out alone or in combination.

Etherification or esterification of starch can yield an instant processed meat product with a softer taste and texture. Crosslinking treatment alone may be carried out for untreated starch. In addition, etherification or esterification may be combined with crosslinking treatment of starch. By combining etherification or esterification with crosslinking treatment of starch, it is possible to reduce the stickiness of the kneaded blend before drying, and further increase the added water content.

The methods for etherification, esterification and crosslinking treatment are not particularly restricted. The etherification may be hydroxypropyl etherification using propylene oxide. The esterification may be acetic acid esterification using acetic anhydride or vinyl acetate. The crosslinking treatment may be phosphoric acid crosslinking using a metaphosphoric acid salt as the crosslinking agent, or adipic acid crosslinking using an adipic acid salt as the crosslinking agent.

The crosslinking degree of the starch may be classified into "high", "medium" and "low", by measurement of the viscosity curve of the starch using a Brabender Amylograph. An Amylograph is an apparatus that automatically heats a suspension of a sample, maintains its temperature, cools it and records changes in its viscosity. A "low" crosslinking degree means a crosslinking degree where starch is crosslinked to an extent such that breakdown (viscosity reduction) is observed during measurement of the viscosity curve. A "medium" crosslinking degree means a crosslinking degree where starch is crosslinked to an extent such that breakdown is not observed during measurement of the viscosity curve, and the viscosity continues to increase resulting in ascension of the viscosity curve. A "high" crosslinking degree means a crosslinking degree where starch is crosslinked to an extent such that the viscosity does not appreciably increase during measurement of the viscosity curve but is essentially constant, resulting in an approximately flat viscosity curve. The crosslinking degree of gelatinized starch is classified into "high", "medium" and "low", by the viscosity curve measured for the β-starch prior to gelatinizing.

Amount of Water Added

In the method for producing a fry-dried instant processed meat product according to one embodiment of the invention, the amount of water added may be 10 mass % or greater, 15 mass % or greater, 20 mass % or greater, 25 mass % or greater, 30 mass % or greater or 40 mass % or greater, and 60 mass % or lower or 50 mass % or lower, of the total amount of the instant processed meat product starting material.

Amount of Gelatinized Starch Added

The amount of gelatinized starch added may be 1 mass % or greater, 2 mass % or greater or 3 mass % or greater, and 15 mass % or lower or 10 mass % or lower, of the total amount of the instant processed meat product starting material. Addition of gelatinized starch in this range can vastly increase the amount of water that can be added to the starting material without impairing the suitability for production, such as the shape retention during molding.

Kneading of the instant processed meat product starting material, gelatinized starch and water may be carried out by using a mixer.

Shaping of the kneaded blend may be carried out, for example, by filling it flat into a container, such as a tray, and freezing, and then dice-cutting the frozen kneaded blend. The kneaded blend may also be converted into a desired form, such as sausages, meatballs or kamaboko, by extrusion molding or simple stuffing into a shaping container, and cutting as necessary.

The shaped kneaded blend is subjected to fry-drying. The shaped kneaded blend may also be dried by atmospheric frying. Here, "atmospheric fry-drying" is a drying method in which the drying is carried out in oil and fat under atmospheric pressure, the temperature of the oil and fat being 100° C. or higher, 130° C. or higher, 140° C. or higher, 150° C. or higher, 160° C. or higher, 170° C. or higher, 180° C. or higher, 190° C. or higher, 200° C. or higher or 210° C. or higher, and 250° C. or lower or 240° C. or lower. Atmospheric frying may be carried out by using a batch fryer, continuous fryer or the like. The shaped kneaded blend may also be dried by vacuum frying.

Atmospheric fry-drying has advantages, such as not requiring a special device, simplifying production processes, or allowing desirable flavors to be imparted to foods by heating in high temperature oil and fat (for example, 100° C. or higher), and therefore atmospheric frying is preferred over vacuum frying.

According to one embodiment of the invention, the fry-dried product obtained by fry-drying is deoiled. When a large amount of oil and fat is present in the main starting material or fry-dried product, and especially when a large amount of oil and fat is adhering to the surface of the fry-dried product, penetration of moisture into the fry-dried product is inhibited by the oil and fat, often impairing the reconstitutability in hot water. In such cases, the oil and fat content may be adjusted by deoiling. The deoiling may be carried out by any desired method. The method of deoiling may be, for example, a method of deoiling by centrifugal separation, or a method of deoiling by application of pressure using compressed air created with an air compressor or the like. When deoiling is carried out by centrifugal separation, any desired centrifugal separator may be used. A centrifugal separator, for the purpose of the invention, is an apparatus that separates or fractionates by centrifugal force, either manually or automatically, and this includes rotating vegetable drainers.

Oil and Fat Content

The fry-dried instant processed meat product according to one embodiment of the invention may have an oil and fat content of up to 45 mass %, up to 40 mass %, up to 35 mass %, up to 30 mass % or up to 25 mass %, and 1 mass % or greater or 5 mass % or greater.

The fry-dried instant processed meat product according to one embodiment of the invention may have a moisture content of up to 5 mass %, up to 4 mass % or up to 3 mass %, and 1 mass % or greater or 1.5 mass % or greater.

Gelatinized Starch Content

The fry-dried instant processed meat product according to one embodiment of the invention may include gelatinized starch at 1 mass % or greater, 3 mass % or greater, 5 mass % or greater or 7 mass % or greater, and 30 mass % or lower, 25 mass % or lower, 20 mass % or lower or 15 mass % or lower, with respect to the mass of the fry-dried instant processed meat product.

The present invention can be used for various different processed meat products, and typically it can be suitably used for processed meat products, including diced meat, sausage, char siu, kamaboko, fish meat sausage and diced fish meat, prepared from livestock meat or fish meat as the starting material.

The fry-dried instant processed meat product of the invention may be used in various different instant foods. The term "instant food", as used herein, refers to a food that is converted to a comestible state in a short period of time (for example, 3 to 5 min) by a preparation method, such as reconstitution in hot water, boiling, or addition of water and heating in a microwave oven. Examples of instant foods include instant noodles (ramen, udon, buckwheat noodles, pan-fried noodles (yakisoba), chilled Chinese noodles, pasta and the like), dry noodles, bean-starch vermicelli, cooked rice, congee, tteok-bokki, kiritanpo, pho, miso soup, soup, pork soup, curry, jjigae, chazuke condiment, red bean soup, zenzai and instant coffee. The "noodles" of the instant noodles includes "fried noodles" obtained by deep-frying noodles in oil and fat, "non-fried noodles" obtained by drying without deep-frying in oil and fat, and "raw type noodles" that have increased storage life by being heat sterilized after treatment in an organic acid solution. Instant foods may be filled into a container that can hold hot water, such as a paper cup and a plastic cup, as in the case of instant cup noodles. In this case, adding hot water directly into the container for reconstitution allows the instant food to be converted to a comestible form. Alternatively, the instant food may be packaged in a plastic bag or the like, and may be converted to a comestible form by boiling after being transferred to a pot, or adding hot water for reconstitution after being transferred to a container, such as a mug, at the time of consumption, or heating with a microwave oven after addition of water.

The present invention exhibits an effect of improved reconstitutability in hot water, by incorporating gelatinized starch that has a water absorbing function in an instant processed meat product, and by providing the dried instant processed meat product with a porous internal structure by significantly increasing the amount of water that can be added to the starting material with the aid of added gelatinized starch. Therefore, the effect of improved reconstitutability in hot water according to the invention may be expected even when the drying method has been changed from fry-drying to a conventional drying method, such as FD or AD.

EXAMPLES

The instant processed meat product dried by fry-drying and the method for producing it will now be explained in greater detail by working examples, with the understanding that the invention is not limited to the examples.

Measurement of Moisture Content

After weighing out 2 g of sample and drying it at 105° C. for 2 hours in an electrodesiccator (trade name: DN-41, by Yamato Scientific Co., Ltd.), the value of the difference in mass measured before and after drying is recorded as the moisture content. The moisture contents referred to throughout the examples were all measured using this method.

Measurement of Rupture Stress by Piercing Test

A rheometer (trade name: NRM-2010 J-CW by Fudo Industry Co., Ltd.) is used for measurement of the rupture stress by a piercing test. The sample is placed on a plate and the table speed is set to 2 cm/min. The sample is pierced by using an adapter (entry elastic circular rod with 1 mm diameter, adapter area: 0.7854 $mm^2$), and the stress at the rupture point is measured.

Sample Reconstitution

Reconstitution of the sample is carried out by adding 200 mL of hot water at 100° C. to a paper container containing the sample, covering it and allowing it to stand for 3 minutes.

Evaluation of Reconstitutability in Hot Water

The reconstitutability in hot water is evaluated by consuming the sample that has been reconstituted for 3 minutes in hot water by the method described above under Sample reconstitution. The evaluation scale is as follows.

Poor: Sample was hard and incomestible.
Fair: Sample was somewhat soft (with some degree of hardness remaining), but comestible.
Good: Sample was soft and comestible
Very Good: Sample was very soft and comestible.

Comparative Example 1 and Examples 1 to 3

After kneading 5 g of gelatinized starch (gelatinized tapioca starch: Matsunorin M22, product of Matsutani Chemical Industry Co., Ltd.), a diced meat starting material (34.7 g of ground pork (lean:fat=1:2), 53.3 g of soaked soybean protein (NEW FUJINIK 51, product of Fuji Oil Co., Ltd.) (21.3 g prior to soaking), 2 g of bread crumb, 2.5 g of onion paste, 2.3 g of egg white (dry egg white K-No5, product of Kewpie Corp.) and 5.2 g of seasoning (salt, sugar, etc.)), and water at 0, 10, 20, or 30 mass % of the total amount of the diced meat starting material, the mixture was filled into a tray with a thickness of 10 mm. The kneaded blend was frozen and shaped by cutting to 10 mm×10 mm×10 mm diced pieces by using a kitchen knife. The frozen diced meat was subjected to atmospheric fry-drying in palm oil at 140° C. The fry-dried product was deoiled by centrifugal separation for 3 minutes at 600 rpm by using a household vegetable drainer (diameter: 20 cm), to obtain dried diced meat with a final moisture content of approximately 2 mass %.

The prepared diced meat sample was evaluated for production suitability and reconstitutability in hot water. The production suitability was evaluated based on the shape retention of the starting material during preparation of the sample. The reconstitutability in hot water was evaluated by consuming the sample that had been reconstituted for 3 minutes in hot water by the method described above. The mass of the prepared diced meat sample was measured. The evaluation results are shown in Table 1.

TABLE 1

| Test No. | Water addition (mass % per total of diced meat starting material) | Reconstitutability in hot water | Production suitability | Mean mass of each diced meat cube (g) (n = 4) |
|---|---|---|---|---|
| Comp. Example 1 | 0 | Poor | A | 0.70 |
| Example 1 | 10 | Fair | A | 0.68 |
| Example 2 | 20 | Fair | A | 0.62 |
| Example 3 | 30 | Good | A | 0.64 |

The judging levels of "A", "B" and "C" in the table represent the following.
A: Good shape retention.
B: Somewhat poor shape retention. Difficult to maintain shape.
C: Poor shape retention, shape not maintained.

In Comparative Example 1 and Examples 1 to 3, it was confirmed that the reconstitutability in hot water improved with increasing water added. In addition, there was no deterioration in production suitability with increasing water added. In other words, addition of gelatinized starch allows the amount of water added to be increased without impairing the production suitability.

Comparative Example 2 and Example 4

Example 4

Dried diced meat was prepared by the method of Comparative Example 1 and Examples 1 to 3, except that the amount of water added was 45 mass % of the total amount of the diced meat starting material.

Comparative Example 2

Dried diced meat was prepared by the same method as Example 4, except that no gelatinized starch was added.

The prepared diced meat sample was evaluated for production suitability and reconstitutability in hot water. The production suitability was evaluated based on the shape retention of the starting material during preparation of the sample. The reconstitutability in hot water was evaluated by consuming the sample that had been reconstituted for 3 minutes in hot water by the method described above. The evaluation results are shown in Table 2.

TABLE 2

| Test No. | Gelatinized starch addition | Production suitability | Reconstitutability in hot water |
|---|---|---|---|
| Comp. Example 2 | Added | C | Poor |
| Example 4 | Not added | A | Good |

The judging levels of "A", "B" and "C" in the table represent the following.
A: Good shape retention.
B: Somewhat poor shape retention. Difficult to maintain shape.
C: Poor shape retention, shape not maintained.

Comparative Example 2 and Example 4 had the same amount of water added. The sample of Example 4 to which gelatinized starch had been added was excellent in terms of both production suitability and reconstitutability in hot water. This is attributed to rapid absorption of water by the gelatinized starch during reconstitution in hot water.

Comparative Examples 3 to 5 and Examples 5 to 7

Dried diced meat was prepared by the method of Comparative Example 1 and Examples 1 to 3, except that the amount of water added was 28 mass % of the total amount of the diced meat starting material, and the deoiling conditions were changed.

The oil and fat contents of the diced meat samples of Comparative Examples 3 to 5 and Examples 5 to 7 were measured by the Soxhlet extraction method. Specifically, 5 to 10 g of the weighed out sample, and a solvent (diethyl ether) were set in a Soxhlet extractor, and the extractor was placed in a hot water bath at 50° C. for 3 hours or longer, using a water bath (trade name: BS600 Water Bath, product of Yamato Scientific Co., Ltd.), to extract the oil and fat in the sample. Following extraction, the diethyl ether was evaporated off and the remaining oil and fat were weighed to determine the oil and fat content of the sample.

The diced meat samples of Comparative Examples 3 to 5 and Examples 5 to 7 that had been reconstituted for 3 minutes in hot water by the method described above, were consumed and the reconstitutability in hot water was evaluated. The diced meat samples of Comparative Examples 3 to 5 and Examples 5 to 7 that had been reconstituted for 3 minutes in hot water by the method described above were also supplied to a piercing test using a rheometer, to measure the rupture stress.

The oil and fat content, reconstitutability in hot water and rupture stress values are shown in Table 3. The rupture stress of Example 7 was below the measurable limit of the device and therefore could not be measured.

TABLE 3

| Test No. | Deoiling conditions | Oil and fat content (mass %) | Reconstitutability in hot water | Rupture stress (g) (average of n = 5) |
|---|---|---|---|---|
| Comp. Example 3 | No centrifugal deoiling (natural deoiling, 5 min standing to cool) | 50.9 | Poor | 456 |
| Comp. Example 4 | 150 rpm, 3 min | 49.1 | Poor | 287 |
| Comp. Example 5 | 300 rpm, 3 min | 48.7 | Fair | 271 |
| Example 5 | 400 rpm, 3 min | 42.3 | Good | 158 |
| Example 6 | 500 rpm, 3 min | 38.3 | Good | 103 |
| Example 7 | 600 rpm, 3 min | 36.3 | Very Good | Unmeasurable |

Table 4 shows the masses of the samples finally obtained from the starting materials (5 g of gelatinized starch, 100 g of diced meat starting material and 28 g of water (28 mass % of the total amount of the diced meat starting material)) for preparation of the samples of Comparative Examples 3 to 5 and Examples 5 to 7, and the gelatinized starch contents of the finally obtained samples (final samples) as calculated from the masses.

TABLE 4

| Test No. | Final sample mass (g) obtained from 5 g gelatinized starch, 100 g diced meat starting material and 28 g water | Gelatinized starch content in final sample (mass %) |
|---|---|---|
| Comp. Example 3 | 79.4 | 6.3% |
| Comp. Example 4 | 77.1 | 6.5% |
| Comp. Example 5 | 76.1 | 6.6% |
| Example 5 | 67.7 | 7.4% |
| Example 6 | 63.7 | 7.8% |
| Example 7 | 59.7 | 8.4% |

Example 8

Dried diced meat was prepared by the method of Comparative Example 1 and Examples 1 to 3, except that esterified crosslinked gelatinized tapioca starch (Parsley PAC, product of Matsutani Chemical Industry Co., Ltd.) was used as the gelatinized starch, and the amount of water added was 28 mass % of the total of the diced meat starting material.

The reconstitutability in hot water was evaluated by consuming the diced meat sample of Example 8 that had been reconstituted for 3 minutes in hot water by the method described above. The results are shown in Table 5.

TABLE 5

| Test No. | Reconstitutability in hot water |
|---|---|
| Example 8 | Good |

Comparative Example 6

Dried diced meat was prepared without addition of gelatinized starch and addition of water.

After kneading a diced meat starting material (44.1 g of ground pork (lean:fat=1:2), 19.6 g of soaked soybean protein (NEW FUJINIK 40, product of Fuji Oil Co., Ltd.) (7.8 g before soaking), 17.6 g of soaked soybean protein (APEX 1000, product of Fuji Oil Co., Ltd.) (3.9 g before soaking), 2.7 g of bread crumbs, 4.0 g of onion paste, 3.0 g of egg white (SUNKIRARA SA, product of Taiyo Kagaku Co., Ltd.) and 9.0 g of seasonings (salt, sugar, etc.)), the kneaded mixture was filled into a tray with a thickness of 10 mm. The tray was kept in a steam cooker for 30 minutes at a center temperature of 70° C. by using steam at 100° C., and then removed. The kneaded blend filled in the tray was then frozen and shaped by cutting to 10 mm×10 mm×10 mm diced pieces by using a kitchen knife. The frozen diced meat was subjected to atmospheric fry-drying in palm oil at 140° C. The fry-dried product was deoiled by centrifugal separation for 3 minutes at 300 rpm by using a household vegetable drainer (diameter: 20 cm), to obtain dried diced meat with a final moisture content of approximately 2 mass %.

The reconstitutability in hot water was evaluated by consuming the diced meat sample of Comparative Example 6 that had been reconstituted for 3 minutes in hot water by the method described above. The diced meat sample of Comparative Example 6 that had been reconstituted for 3 minutes in hot water by the method described above was also supplied to a piercing test using a rheometer, to measure the rupture stress. The reconstitutability in hot water and rupture stress value are shown in Table 6.

TABLE 6

| Test No. | Reconstitutability in hot water | Rupture stress (g) (average of n = 5) |
|---|---|---|
| Comp. Example 6 | Poor | 1215.8 |

Observation of Diced Meat Samples by Using Microscope

Figure 2:
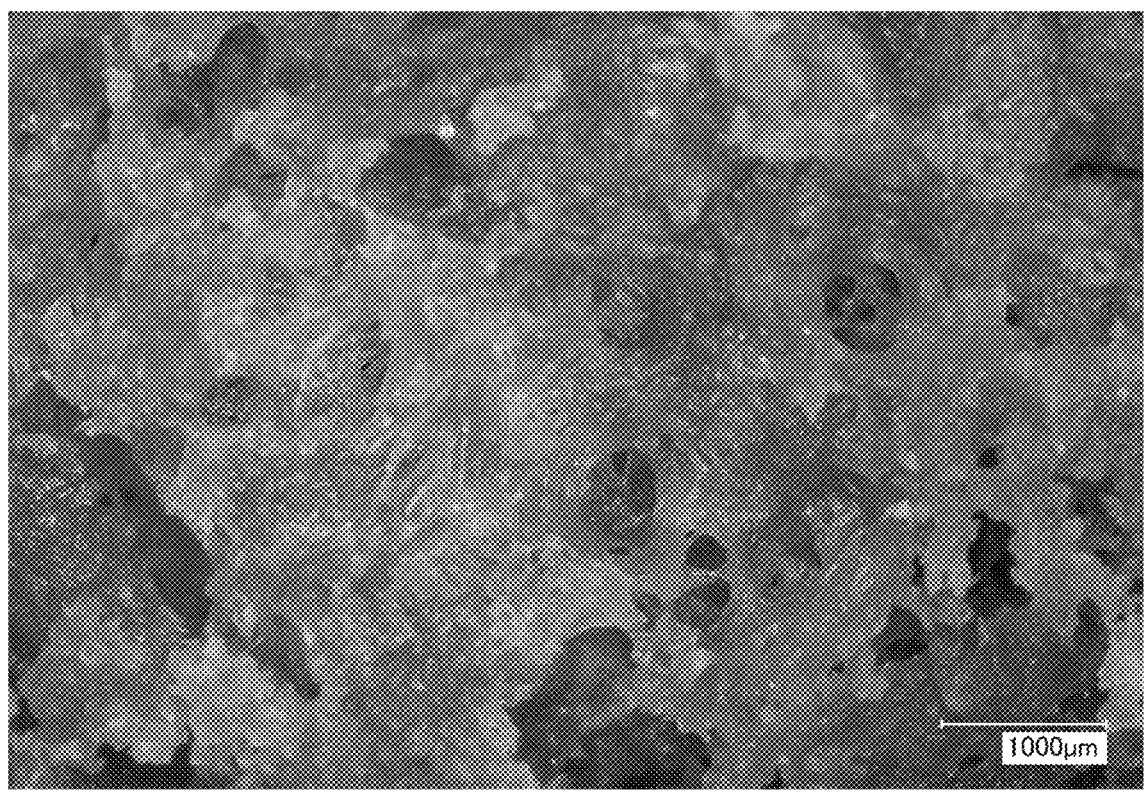
FIG. 2 is a photograph taken of the dried diced meat sample of Example 7 according to an embodiment of the invention, at a magnification of 50×.

The diced meat samples of Comparative Example 6 and Example 7 were observed under a microscope (trade name: VH-7000 by Keyence Corp.), and photographs were taken at a magnification of 50×, as shown in FIG. 1 and FIG. 2. Based on these photographs, it is understood that addition of gelatinized starch and addition of water resulted in greater porosity of the internal structure of the diced meat.

Comparative Examples 7 and 8, and Examples 9 to 11

Dried diced meat was prepared by the method of Comparative Example 6, except that the additional starting materials listed in Table 7 below were added at 5 mass % of the total amount of diced meat starting material (i.e., 5 g), and water was added. The starches of Comparative Examples 7 and 8 and Examples 9 to 11 all had etherification degrees (degrees of substitution) of DS 0.1. The additional starting materials and water were added during kneading of the diced meat starting materials. In the column labeled "Water addition" in Table 7, the amounts of water added to each of the diced meat starting materials are represented as mass % based on the total amounts of the diced meat starting materials. The amount of water added was set by adjusting the hardness of the kneaded blend when the diced meat starting material, additional starting materials and water were kneaded, to be equivalent to the hardness of Example 9.

The reconstitutability in hot water and taste and texture of the samples were evaluated. The evaluation was carried out by consuming the sample that had been reconstituted for 3 minutes in hot water by the method described above. The evaluation results are shown in Table 7.

TABLE 7

| Test No. | Additional starting material | Cross-linking degree | Water addition | Reconstitutability in hot water | Taste and texture |
|---|---|---|---|---|---|
| Comp. Example 7 | Etherified phosphate-crosslinked potato starch (β) | High | 30 mass % | Poor | Poor (hard) |
| Comp. Example 8 | Etherified potato starch (β) | No cross-linking | 28 mass % | Poor | Poor (hard) |
| Example 9 | Etherified phosphate-crosslinked gelatinized potato starch | High | 40 mass % | Good | Good |
| Example 10 | Etherified phosphate-crosslinked gelatinized tapioca starch | High | 38 mass % | Good | Good |
| Example 11 | Etherified gelatinized potato starch | No cross-linking | 38 mass % | Good | Good |

When the sample of Example 9 was compared with that of Comparative Example 7, and the sample of Example 11 was compared with that of Comparative Example 8, satisfactory reconstitutability in hot water and satisfactory taste and texture after reconstitution in hot water were achieved only with the gelatinized starch, even though the starting materials were the same and the starch had been subjected to the same processing. Gelatinizing of starch is necessary to improve reconstitutability in hot water. Further, in the samples of Example 9 and Example 10, the gelatinized potato starch and gelatinized tapioca starch were confirmed to exhibit equivalent reconstitutability in hot water.

Comparative Example 9 and Examples 12 to 17

Dried diced meat was prepared by the method of Comparative Example 6, except that the additional starting materials listed in Table 8 below were added at 5 mass % of the total amount of diced meat starting material (i.e., 5 g), and water was added. The additional starting materials and water were added during kneading of the diced meat starting materials. In the column labeled "Water addition" in Table 8, the amounts of water added to each of the diced meat starting materials are represented as mass % based on the total amounts of the diced meat starting materials. The amount of water added was set by adjusting the hardness of the kneaded blend when the diced meat starting material, additional starting materials and water were kneaded, to be equivalent to the hardness of Example 12.

The reconstitutability in hot water and taste and texture of the samples were evaluated. The evaluation was carried out by consuming the sample that had been reconstituted for 3 minutes in hot water by the method described above. The evaluation results are shown in Table 8.

TABLE 8

| Test No. | Additional starting material | Cross-linking degree | Water addition | Reconstitutability in hot water | Taste and texture |
|---|---|---|---|---|---|
| Comp. Example 9 | Etherified potato starch (β) | No cross-linking | 30 mass % | Poor | Poor (hard) |
| Example 12 | Etherified phosphate-crosslinked gelatinized potato starch | High | 40 mass % | Good | Good |
| Example 13 | Esterified phosphate-crosslinked gelatinized potato starch | Medium | 38 mass % | Good | Good |
| Example 14 | Phosphate-crosslinked gelatinized tapioca starch | Medium | 38 mass % | Fair | Fair |
| Example 15 | Esterified gelatinized tapioca starch | No cross-linking | 38 mass % | Good | Good |
| Example 16 | Gelatinized tapioca starch | No cross-linking | 38 mass % | Good | Good |
| Example 17 | Phosphate-crosslinked gelatinized tapioca starch | Low | 38 mass % | Good | Good |

The samples with addition of gelatinized starch exhibited highly superior reconstitutability in hot water and taste and texture compared to Comparative Example 9 which had addition of β-starch, regardless of etherification, esterification or crosslinking.

Comparative Example 10

Dried diced meat was prepared by the method of Comparative Example 6, except that insoluble dietary fibers (FIBERSOY SA, US Solae LLC) having a water absorbing function similar to gelatinized starch was added at 5 mass % of the total amount of diced meat starting material (i.e., 5 g), and water was added at 30 mass % of the total amount of the diced meat starting material. The insoluble dietary fibers and water were added during kneading of the diced meat starting material. The atmospheric fry-dried diced meat sample had a porous internal structure, as with the samples with addition of gelatinized starch. However, while consumption and evaluation of the samples that had been reconstituted for 3 minutes in hot water by the method described above confirmed satisfactory reconstitutability in hot water, the powdery and rough taste and texture which are characteristic of insoluble dietary fibers were noticeable, and it was therefore evaluated as poor.

In Examples 9 to 17, the gelatinized starch was added at 5 mass % of the total amount of the instant processed meat product starting materials other than the gelatinized starch and water. In these examples, 5 g of the gelatinized starch, 100 g of the instant processed meat product starting material (total: 105 g) and the water added, after fry-drying and centrifugal deoiling, provided an approximately 50 g of instant processed meat product. Thus, the gelatinized starch contained in the instant processed meat product starting material after frying was about 10.0 mass % per mass of the instant processed meat product after frying.

Comparative Example 11

After kneading a total of 100 g of diced fish meat starting material (94 g of raw cod (minced in a bowl), 2 g of caster sugar, 2 g of salt and 2 g of sodium glutamate), the kneaded mixture was filled into a tray with a thickness of 10 mm. The mixture was frozen and shaped by cutting to 10 mm×10 mm×10 mm diced pieces by using a kitchen knife. The frozen diced fish meat was subjected to atmospheric fry-drying in palm oil at 140° C. The fry-dried product was centrifugally separated for 2 minutes at 600 rpm by using a household vegetable drainer (diameter: 20 cm) for deoiling, to obtain dried diced fish meat (dried diced cod meat).

Comparative Example 12

Dried diced fish meat was obtained under the same conditions as Comparative Example 11, except that during kneading of the diced fish meat starting material of Comparative Example 11, water was added at 20 mass % of the total amount of the diced fish meat starting material.

Example 18

Dried diced fish meat was obtained under the same conditions as Comparative Example 11, except that during kneading of the diced fish meat starting material of Comparative Example 11, water was added at 20 mass % of the total amount of the diced fish meat starting material, and gelatinized starch (gelatinized tapioca starch: Matsunorin M22, product of Matsutani Chemical Industry Co., Ltd.) was added at 5 mass % of the total amount of the diced fish meat starting material (i.e., 5 g).

Example 19

Dried diced fish meat was obtained under the same conditions as Comparative Example 11, except that during kneading of the diced fish meat starting material of Comparative Example 11, water was added at 40 mass % of the total amount of the diced fish meat starting material, and gelatinized starch (gelatinized tapioca starch: Matsunorin M22, product of Matsutani Chemical Industry Co., Ltd.) was added at 5 mass % of the total amount of the diced fish meat starting material (i.e., 5 g).

The samples of Comparative Examples 11 and 12 and Examples 18 and 19 were used for measurement of the moisture content, measurement of rupture stress by a piercing test, measurement of oil and fat content and evaluation of reconstitutability in hot water. Measurement of the moisture content was carried out by the method described above. The rupture stress by a piercing test was measured by supplying the sample that had been reconstituted for 3 minutes in hot water by the method described above, to a piercing test using a rheometer. The oil and fat content was measured according to the Soxhlet extraction method, in the same manner as explained for Comparative Examples 3 to 5 and Examples 5 to 7. The reconstitutability in hot water was evaluated by consuming the sample that had been reconstituted for 3 minutes in hot water by the method described above. The results are shown in Table 9.

TABLE 9

| | Water content (mass %) | Rupture stress (g) (average of n = 5) | Oil and fat content (mass %) | Reconstitutability in hot water |
|---|---|---|---|---|
| Comp. Example 11 | 4.6 | 908 | 28.4 | Poor |
| Comp. Example 12 | 4.9 | 759 | 33.2 | Poor |
| Example 18 | 4.8 | 598 | 30.1 | Good |
| Example 19 | 4.8 | 493 | 31.9 | Very Good |

In Examples 18 and 19, the gelatinized starch was added at 5 mass % of the total amount of the instant processed meat product starting materials other than the gelatinized starch and water. In these examples, 5 g of the gelatinized starch, 100 g of the instant processed meat product starting material (total: 105 g) and the water added, after fry-drying and centrifugal deoiling, provided 38.5 g of instant processed meat product in Example 18 and 37.9 g in Example 19. Thus, the gelatinized starch contained in the instant processed meat product starting material after frying was 13.0 mass % in Example 18 and 13.2% in Example 19, per mass of the instant processed meat product after frying.

The invention claimed is:

1. A method for producing a fry-dried instant processed meat product, the method including:

preparing an instant processed meat product starting material, gelatinized starch that is obtained by gelatinization, drying and grinding of a starch starting material selected from the group consisting of tapioca, potato starch, corn starch, waxy corn starch, wheat starch, and sweet potato starch, and water, kneading the instant processed meat product starting material, the gelatinized starch and water to obtain a kneaded blend, shaping the kneaded blend, and atmospheric fry-drying the shaped kneaded blend to obtain a fry-dried product, wherein the amount of water added is 28 to 60 mass % of the total amount of the instant processed meat product starting material.

2. A method for producing a fry-dried instant processed meat product according to claim 1, wherein the amount of gelatinized starch added is 1 to 15 mass % of the total amount of the instant processed meat product starting material.

3. A method for producing a fry-dried instant processed meat product according to claim 1, the method including deoiling the fry-dried product to an oil and fat content of no greater than 45 mass %.

* * * * *